INVENTOR
Albert Kürzl
BY S[illegible] & S[illegible]
ATTYS.

July 30, 1968 A. KÜRZL 3,395,330

FREQUENCY MULTIPLIER WITH VARACTOR DIODE AND SERIES RESONANT CIRCUITS TO COMPENSATE FOR CHARGE STORAGE EFFECT

Filed Sept. 29, 1965 4 Sheets-Sheet 2

INVENTOR
Albert Kürzl

BY Spiel & Spiel
ATTYS.

INVENTOR
Albert Kürzl

BY Spice & Spice

ATTYS.

Fig.6
| | a | b | c | d | |
|---|---|---|---|---|---|
| λ/2 – | 2f | 3f | 4f | 5f | · |
| | 4f | 6f | 8f | 10f | · |
| | 6f | 9f | 12f | · | · |
| | 8f | · | · | · | · |
| | 10f | · | · | · | |
| | ⋮ | · | | | |
Fig.7
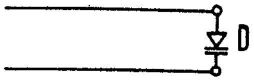
| | p | q | r | s | | |
|---|---|---|---|---|---|---|
| λ/4 – | 2f | 3f | 4f | 5f | · | · |
| | 6f | 9f | 12f | 15f | · | · |
| | 10f | 15f | · | · | · | |
| | 14f | · | · | · | | |
| | ' | · | · | · | | |
Fig.9
| | 2 | 3 | 4 | 5 | 6 | 7 | 8 | 9 | 10 |
|---|---|---|---|---|---|---|---|---|---|
| | 3f | — | 5f | — | 2f 5f 7f | 5f | 5f 7f | 3f 5f 7f | 2f 5f 7f 11f |
| | — | a | b,p | a,b | d,r | a,b | c,d,p | a | c,d |
| Sm | 1 | 1 | 3 | 2 | 5 | 3 | 5 | 4 | 6 |
| Sm' | 1 | 2 | 3 | 4 | 5 | 6 | 7 | 8 | 9 |
| E | 0 | 1 | 0 | 2 | 0 | 3 | 2 | 4 | 3 |
INVENTOR
*Albert Kürzl*
BY *Spiess & Spiess*
ATTY United States Patent Office 3,395,330

Patented July 30, 1968

3,395,330

FREQUENCY MULTIPLIER WITH VARACTOR DIODE AND SERIES RESONANT CIRCUITS TO COMPENSATE FOR CHARGE STORAGE EFFECT

Albert Kürzl, Munich-Lochhausen, Germany, assignor to Siemens Aktiengesellschaft, Munich, Germany, a corporation of Germany Filed Sept. 29, 1965, Ser. No. 491,461
Claims priority, application Germany, Sept. 30, 1964, S 93,519
5 Claims. (Cl. 321—69)

ABSTRACT OF THE DISCLOSURE

A varactor diode frequency multiplier system utilizing a plurality of series resonant circuits to compensate for "charge storage" effects. The series resonant circuits short circuit the varactor diode at all harmonics falling between the first and output harmonic frequencies.

The invention relates to a passive frequency multiplier, preferably for the range of the very short electromagnetic waves, such as the decimeter and centimeter waves, in which a nonlinear element, such as a varactor diode, is provided which supplies the basic oscillation over a band filter attuned to the basic frequency, with the required harmonic being obtained over a band filter tuned to a frequency of the required harmonic and, moreover, in which there are provided series resonance circuits connected in parallel with the varactor diode, acting as auxiliary circuits which are tuned to harmonics differing in frequency from the required harmonic.

For the passive frequency multiplication there has become prevalent to a great extent the use of varactor diodes because, in comparison to the frequency multipliers with crystal diodes operated in the pass range, the losses in the varactor diode are appreciably less. Passive frequency mutipliers with at least one varactor diode have become known in the meantime for multiplication factors between 2 and about 6, in which, on the principle of the parametric amplifier so-called auxiliary circuits were provided; this latter comprising series resonance circuits which are tuned to harmonics which lie between the basic oscillation and the required harmonic. The essential component of the conversion loss results according to these conceptions, from the fact that the unavoidable path resistance of the varactor diode is established by the current in the basic oscillation and the individual currents determined by the auxiliary circuits and the output filter at the required harmonic. For this reason, too, heretofore the selected number of auxiliary circuits was not very high, in order to keep the conversion losses as low as possible and to raise the efficiency as high as possible. As theoretical investigations show the efficiency attainable with such frequency multipliers would have to lie considerably higher than the values actually achieved. For example the multiplier having a multiplication factor of 6, with auxiliary circuits at the doubled or triple frequency of the basic oscillation, the conversion losses in favorable cases are still on the order of 8 to 10 db, while theoretically, as viewed overall, a considerably lower conversion loss would have to be possible of achievement.

The invention, therefore, has as its problem in a frequency multiplier of the type referred to, the achievement of an appreciably better approximation of the obtained efficiency to the theoretically possible value.

This is possible, according to the invention through the feature that the frequency multiplier is designed for a multiplication factor greater than three and preferably not appreciably greater than ten, and that at least for the predominant part, preferably for all further harmonics lying between the basic frequency and the required harmonic, auxiliary circuits are provided in the form of series resonance circuits.

It is of advantage here if, moreover, for next higher harmonic than the required harmonic auxiliary circuits are also provided in the form of series resonance circuits.

It is also recommended, additionally, that the construction further be accomplished in such a way that for the achievement of a multiplication factor above ten several passive multipliers with a multiplication factor below ten, in each case as high as possible, are connected in series, for example, for a total multiplication factor of 36, two multipliers, each with a multiplication factor of 6.

In the invention, there is taken as a starting point the concept that for an increase of the achieved efficiency, it is not a case that any parametric processes in the multiplier circuit are determinative. Rather, the important property of varactor diodes is that they show, following a strong overcontrol into the flow range, on recession of the applied control voltage in each case, a diffusion current which is directed in opposite direction to the control current in flow direction, and to which, in the case of sufficiently long recombination time in the varactor diode to be used (which should preferably be long as against the period duration of the basic oscillation) a charge is allocated which is at least very nearly equal in amount to the charge established by the control into the flow range. It must be made certain that this diffusion current receives, insofar as possible, its exact curve form created in the diffusion process and that such form is not distorted by external circuit elements.

This means that, with reference to the blocking layer of the varactor diode, insofar as possible, for all harmonics with the exception of the one to be obtained a short circuit over auxiliary circuits should be present and a high-ohmic idling should be avoided. Each of the short-circuit currents, to be sure, then causes a certain loss component in the individual harmonics in the path resistance of the capacitance diode, but these loss components bring about a considerably lower reduction of the efficiency than the reduction of efficiency occurring in the case of distortions of the curve form of the diffusion current in consequence of lack or insufficient number of auxiliary circuits. Through a Fourier analysis of the diffusion current running as to time roughly in the form of a sawtooth, it is possible to show that the current components for the individual harmonics diminish with increasing ordinal number of the harmonic, and that the decrease, viewed from an amplitude consideration, takes place approximately at $l{:}n$, if $n$ is the ordinal number of the particular harmonic. If, therefore, by way of example, in multiplier with a factor of 6, there are used auxiliary circuits only for the harmonics with the ordinal or multiplication numbers 2 and 3, the curve distortions of the diffusion current are then extremely high, because the amounts of the disadvantageously influenced diffusion current components are still appreciably high in the other harmonics with the ordinal numbers 4 and 5.

From this observation it is also apparent that a further increase of the efficiency is achievable if at least for the next high harmonic, adjacent to the required harmonic, auxiliary circuits with series resonance characteristics are provided.

For a multiplier with a multiplication factor of 6, as a rule, it should be sufficient if auxiliary circuits are provided for the harmonics with the ordinal numbers 2 to 5 and 7 and 8, in order to approximate the theoretically determinable maximal value of efficiency. The last-mentioned requirement for the formation of an external short circuit with the harmonic of higher frequency is as a rule additionally favorably influenced, in a certain sense by the property of the varactor diode, namely the unavoidable casing capacitance, because this, especially for the higher harmonics, forms a capacitance short circuit improving with increasing ordinal number. It is possible, therefore to even artificially increase such casing capacitance, hitherto considered troublesome, and, accordingly further favorably influence the efficiency.

The invention is explained below with the aid of examples illustrated in the drawing, in which:

FIG. 1 comprises graphs illustrating semiconductor characteristics;

FIGS. 6 and 7 illustrate line characteristics;

FIG. 9 is a table of multiplication factors with references to FIGS. 6 and 7.

Figure 1:
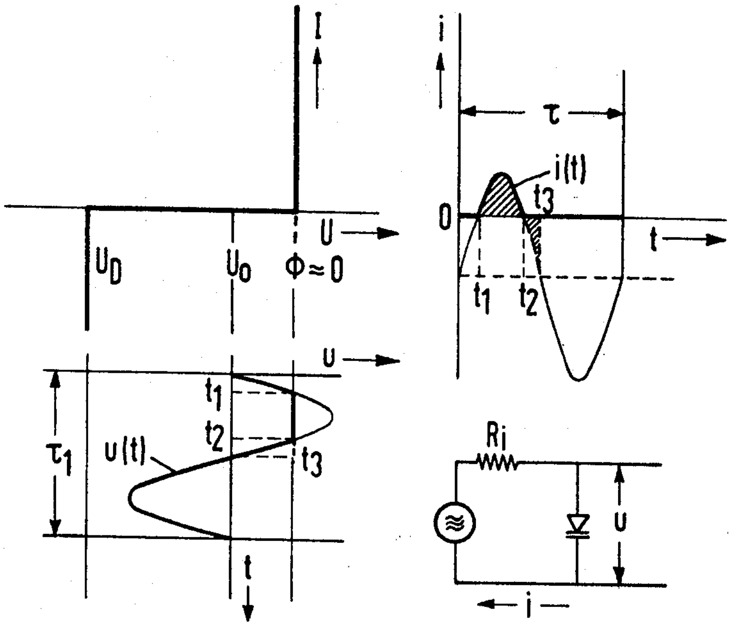

In FIG. 1 there is represented an idealized current-voltage characteristic curve of a semiconductor diode, under it the time course of a modulation voltage, to the right, at the side of the characteristic curve, the current course associated with it, and to the lower right, the circuit with which the given voltage and current course can be measured. Current and voltage courses are indicated for two cases, namely for a rectifier, and for a varactor diode. In the case of sine-form modulation voltage relative to the diode bias voltage $U_0$ both the rectifier diode as well as the varactor diode during the time $t_1$ to $t_2$ act as voltage limiters. The diode voltage $u$, therefore, cannot rise appreciably above the contact potential $\phi$ of an pn-transition, which, for reasons of simplication, is assumed as approximately zero in FIG. 1 and, as a rule, lies at a few tenths volts. During the time $t_1$ to $t_2$ there flows through the diode this top sine shaped current $i(t)$, which is proportional to the generator voltage. At the time $t_2$ the current is again zero. In the rectifier diode it remains, from this time on, zero and the diode voltage again follows the generator voltage (thick solidly drawn current and voltage curve). In the varactor diode, on the other hand, there flows, after $t_2$, a so-called diffusion current in negative current direction, because the charge carriers of the pn-transition that have penetrated into the adjacent areas during the positive half-wave, that is, in the space of time $t_1$ to $t_2$, have not yet or have only partially recombined (charge storage effect). This diffusion current flows from the point of time $t_2$ until all the stored charge carriers are again in their areas of origin. At this time $t_3$ the current more or less abruptly ceases flowing and the diode voltage which in the varactor diode remains on the contact potential until $t_3$, drops correspondingly more or less abruptly to the instantaneous value of the generator voltage (thick broken curve).

Figure 2:
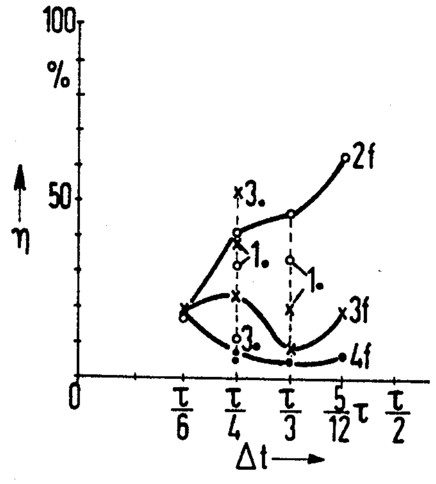
FIG. 2 is a graph of the energy component, referred to the fundamental wave energy of the second, third and fourth harmonics.

Best suited for frequency multiplication are those varactors in which charge carriers recombine as little as possible, so that the cross-hatched current areas which characterize the charge are approximately equal in size. A current and voltage analysis according to Fourier shows that the energy of each harmonic of the basic wave resulting through the distortion is different according to current flow time $\Delta t = t_2 - t_1$. In FIGURE 2 there is plotted the energy component referred to the basic wave energy, of the second, third and fourth harmonics, therefore at the frequencies $2f$, $3f$ and $4f$ ($f$=fundamental wave frequency), in the form of the efficiency $\eta$ in dependence on the current flow time $\Delta t$, $\tau$ being the period duration of the fundamental vibration. In the interest of simplicity, the higher harmonics are not illustrated. It is evident that the energy constituents of each harmonic depend strongly on the current flow time and thereby both on the diode bias voltage $U_0$ and also on the modulation voltage $u(t)$. For each harmonic, therefore, there is an optimal current flow time. For an optimal multiplier operation the current flow time must be selected at which the desired harmonic has optimal energy.

Figure 3:
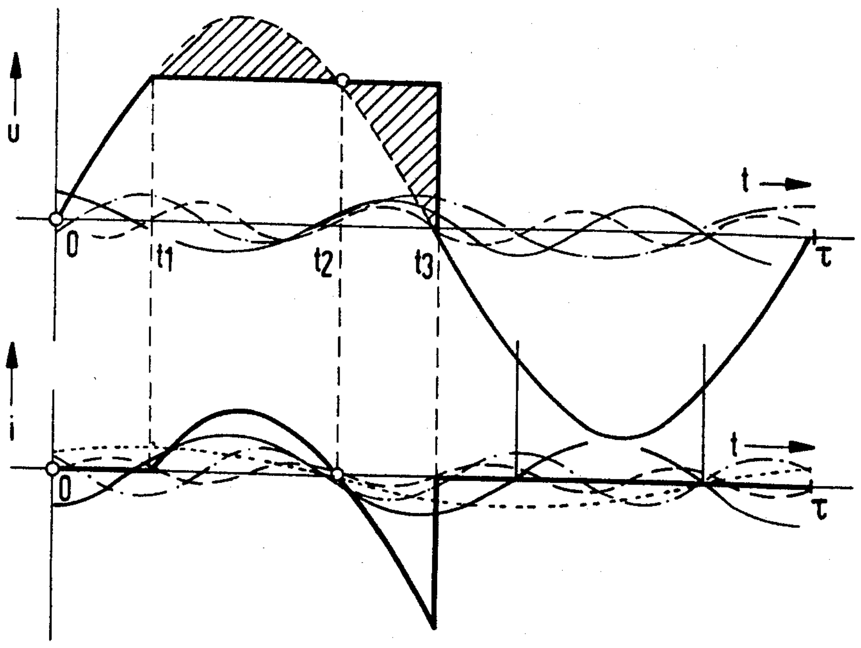
FIG. 3 illustrates current and voltage courses, and harmonics according to Fourier.

In FIGURE 3 there are again represented for a current flow time of $\tau/4$ the voltage and current course, and the overtones determined according to Fourier. This case is for a tripling optimally corresponding to FIGURE 2. For the optimal tripler operation, however, no energy must be consumed at the harmonics other than at the $3f$ harmonic. For this purpose, a reactance must be offered to the varactor for the undesired harmonics. With the aid of the Fourier analysis it can be shown that then, at the desired $3f$-harmonic, most of the energy can be derived, if the varactor is short-circuited for the undesired harmonics. Only in this case is the current course preserved in principle, as it appears in FIGURE 3. If, on the other hand, a circulating current at an undesired harmonic is perfectly impeded in its flow, for example, by opening the circuit for this harmonic, the total current course then is disturbed in such a way that even at the desired harmonic no more current flows—that is, no energy can be taken at the desired harmonic. The varactor then also absorbs no fundamental wave energy, and, therefore, it reflects at the fundamental frequency. Through the path resistance and the stray reactances of the reactor this process is, to be sure, somewhat weakened, but the efficiency is always poorer than when the undesired harmonics are short-circuited at the varactor.

Figure 4:
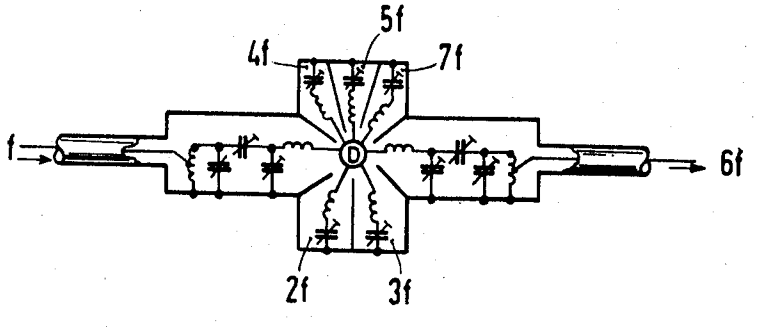
FIG. 4 illustrates a schematic circuit of a multiplier with a multiplication factor of 6.

For the reasons described, for example, a multiplier with a multiplication factor of 6 was constructed as schematically represented in FIGURE 4, with auxiliary circuits, such as series resonance circuits for $2f$, $3f$, $4f$, $5f$ and $7f$, while for the fundamental frequency $f$ and the desired output frequency $6f$ band filters are provided. The metal shield casing of the multiplier is subdivided for this purpose into seven chambers, a chamber being provided for the input filter, one for the output filter, and the other five chambers being respectively provided for each auxiliary circuit. To advantage, the subdivision of the metal casing is made, for example, in a star-form about the varactor diode disposed in the central zone, in such a way that the connection with the diode can be easily carried out. It is recommended in this case that the individual circuits and filters be so designed that these terminate with an inductance at the diode. These chambers serve for the shielding of the individual circuits against one another, whose tuning frequencies with reference to the fundamental frequency $f$ are in each case correlated. In the center of the arrangement the varactor D is assumed to be connected on one side with the casing G providing the reference potential and, on the other side, to the junction of all the circuits.

Figure 5:
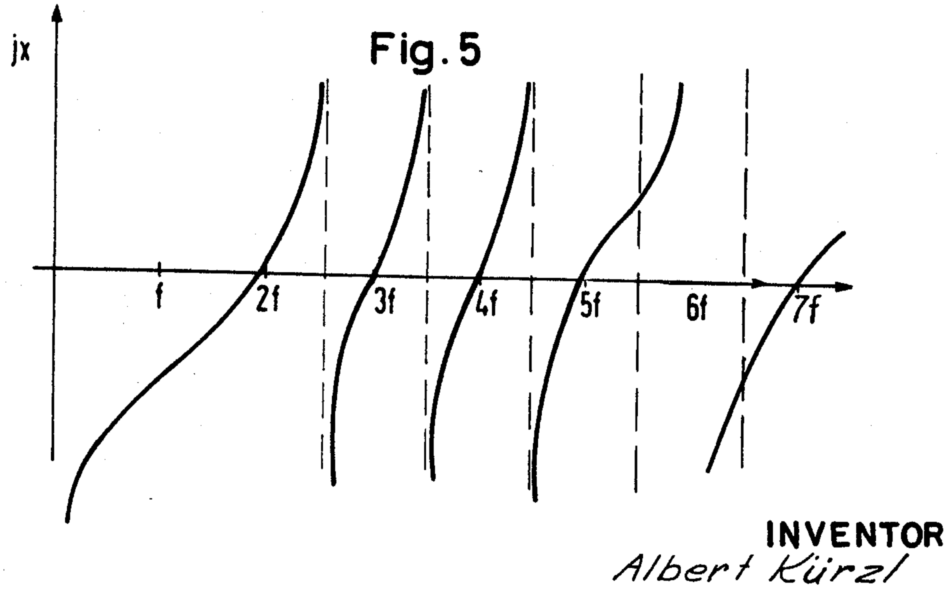
FIG. 5 is a chart illustrating the behavior of the auxiliary circuits of FIG. 4.

In FIGURE 5 the reactance behavior of the five auxiliary circuits connected in parallel to the varactor is plotted in dependence on the frequency. Through parallel connection of five series resonance circuits there arise, as, is well known, five zero points (short circuits) and six poles (parallel resonances). With corresponding tuning of these auxiliary circuits it can be achieved that these zero points occur at $2f$, $3f$, $4f$, $5f$ and $7f$ and a pole at $6f$, that is, at the desired output frquency. One pole lies at the frequency zero, another at infinite frequency, the others between the zero points so that they cause no trouble.

At the harmonics to be short-circuited, therefore, there must always occur zero points, while such points must in no case occur at the fundamental and output frequency.

In the event large multiplication factors are involved it may be difficult to accommodate the necessary number of auxiliary circuits spatially without utilizing additional lines between auxiliary circuits and varactor, which necessarily have transformation properties.

This difficulty, however, can be met in a surprisingly simple manner by utilizing the property, in itself troublesome, of line sections presenting periodically repeating series and parallel resonances in dependence on the frequency. In FIGURE 6 there is illustrated a double line short-circuited at one end, which is to be connected with its open end to the diode D, as, for example, the diode D in FIGURE 4. This double line can be a strip line, a coaxial line, also a so-called micro strip or also a hollow line. Electrically what is essential is only that it show the properties of a Lecher line. In the table of FIGURE 6 it is further shown at what harmonics (if by the second harmonic there is meant the harmonic with double the basic frequency $f$) the line shows series resonance behavior at the connecting point of the diode. In the table there are indicated only four geometric line lengths $a$, $b$, $c$ and $d$, from which, the table is analogously developed for other dimensions. For the geometric line length $a$, the series resonance of lowest frequency should occur at twice the fundamental frequency, that is, at the second harmonic. For the geometric length $b$ the lowest series resonance frequency should occur at the third harmonic, for the geometric length $c$ the lowest series reference should occur at the fourth harmonic and for the geometric length $d$ the lowest-frequency series resonance should occur at the fifth harmonic. In the columns under the data for the geometric lengths $a$, to $d$ there are thus given the harmonics for which the geometric length, by reason of the line character, likewise yields series resonance. In FIGURE 7 the same representation is given for the case in which the line end away from the diode D is open.

As is apparent from FIGURES 6 and 7, there is already provided through the line sections open at the ends, or short circuited, the possibility of compelling series resonances for a large number of harmonics with the exception of the fundamental vibration (first harmonic) and for the harmonic to be utilized as the output vibration. As it has proved, for this it is sufficient if two such line sections are employed, possibly with additional use of a few auxiliary circuits in the form of concentrated or lumped circuits, that is, with a concentrated capacitance and inductance. The short-circuited line sections are there to be so designed, of course, in a manner known per se, that they do not short-circuit the diode for direct current—that is, they are to be connected to the diode either over capacitor presenting a high-frequency short-circuit or to be short circuited by means of a capacitor forming a high-frequency short circuit at the end away from the diode.

Figure 8:
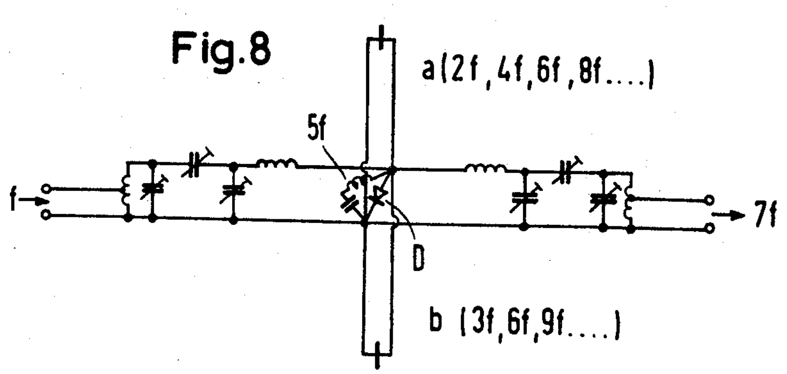
FIG. 8 illustrates the circuit of a multiplier having a multiplication factor of 7.

For the case of a multiplier with a factor of 7, the use of line sections for series resonance formation at certain harmonics is schematically represented in FIGURE 8. The fundamental vibration at the frequency $f$ is fed over a band filter to the diode D. The seventh harmonic, intended as output vibration, with the frequency $7f$ is obtained over a band filter. Parallel to the diode D two line sections are connected of which the one has a geometric length dimension $a$ and the other a geometric length dimension $b$, corresponding to FIGURE 6. These two line resonance circuits produce series resonances for the harmonics with the frequencies $2f$, $3f$, $4f$, $6f$, $8f$, $9f$, etc. In order not to introduce series resonances for the still-open fifth harmonic, a series resonance circuit of concentrated construction is connected parallel to the diode D, which circuit is correspondingly tuned.

In order to give a survey of possible constructions of a multiplier in this manner, which has the smallest number of necessary auxiliary circuits, there is set forth in FIGURE 9 a table for multiplication factors from 2 to 10 with reference to FIGURES 6 and 7. In the table there are presented at the top the multiplication factors and in the columns under the multiplication factors there is presented, first, what auxiliary lines are to be used with the geometric dimensions corresponding to FIGURES 6 and 7. Then follows the data on the auxiliary circuits to be used in concentrated circuit technique, in which case there are given in each instance only the tuning frequencies. The basic assumption for the table is there that for all harmonics which lie between the first harmonic, serving as input vibration, and the required harmonic, serving as output vibration, there should occur series resonances both for the harmonic following immediately upon that required as well as for the next higher harmonic. In order to make a comparison, in the individual columns there is also given the sum $Sm$ which results if there are counted together for each column in teach instance the number of auxiliary circuits executed in concentrated circuit technique and the line sections to be correspondingly used. In addition, underneath $Sm$ there is also entered the magnitude $Sm'$ for the individual columns, which indicates how many auxiliary circuits in concentrated circuit technique would have to be provided if there are provided only those concentrated circuit techniques.

The saving E achieved is thereafter separately set forth for each column. As is apparent from the table, for the multiplication factors of 2, 4 and 6 apparently no gain is achievable through auxiliary lines, while the gain increases steady for the multiplication factors 3, 5, 7, 9, etc. For even-numbered multiplications from 8 onward a gain is likewise already obvious. The actual gain through the auxiliary lines is, however, in practice still higher, because auxiliary lines in actuality additionally short circuit considerably higher harmonics than the harmonic required as output virbration in the desired manner, whereby there is achieved a still better approximation of the desired current curve from utilization of the invention.

Changes may be made within the scope and spirit of the appended claims which define what is believed to be new and desired to have protected by Letters Patent.

I claim:

1. A frequency multiplier system for receiving an alternating current signal of a fundamental frequency and multiplying the same an integral number of times which is greater than three, to form an output frequency signal, said system including in combination, a varactor diode, an input circuit for coupling said varactor diode to means providing the alternating current signal, said input circuit being constructed to attenuate harmonics of the fundamental frequency greater than the first harmonic, output means coupling said varactor diode to a load and forming an output filter constructed to attenuate harmonics lower than the desired output harmonic frequency, and series resonant circuits for achieving maximum efficiency of operation, connected in parallel with the varactor diode operative to short circuit the latter at all harmonics falling between the first and the output harmonic by resonating at such harmonics, whereby an overcontrol of the varactor diode into the flow range is effected by the current signal of the fundamental frequency of such a value that on recession of the applied control a diffusion current flows, which is directed in opposite direction to the control current in flow direction.

2. A frequency multiplier system for receiving an alternating current signal of a fundamental frequency and multiplying the same an integral number of times, which is greater than three, to form an output frequency signal, said system including in combination a varactor diode, an input circuit coupling said varactor diode to means providing the alternating current signal, said input circuit being constructed to attenuate harmonics of the fundamental frequency greater than the first harmonic, output means coupling said varactor diode to a load and forming an output filter constructed to attenuate harmonics lower than the desired output harmonic frequency, and series resonant circuits for achieving maximum efficiency of operation, connected in parallel with the varactor diode operative to short circuit the latter at all harmonics falling between the first and the output harmonic and at harmonics falling immediately above the output harmonic by resonating at such harmonics, whereby an overconrtol of the varactor diode into the flow range is effected by the current signal of the fundamental frequency of such a value, that on recession of the applied control a diffusion current flows, which is directed in opposite direction to the control current in flow direction.

3. A frequency multiplier system according to claim 1, wherein the input coupling circuit, the output coupling circuit and the series resonant circuits for said harmonics are arranged in chambers, shielded with respect to one another, of a casing of star-like configuration enclosing the varactor diode, said coupling means and said circuits being terminated in each case at the varactor diode by means of a longitudinal inductivity.

4. A frequency multiplier system according to claim 2, wherein the input coupling circuit, the output coupling circuit and the series resonant circuits for said harmonics are arranged in chambers, shielded with respect to one another, of a casing of star-like configuration enclosing the varactor diode, said coupling means and said circuits being terminated in each case at the varactor diode by means of a longitudinal inductivity.

5. A frequency multiplier system according to claim 2, wherein the series resonant circuits are of the lumped constant type, i.e., resonant lines which are so dimensioned that such resonant lines short circuit the varactor diode at the harmonics falling between the first and the output harmonic and present an open circuit at the varactor diode for the first and the output harmonic.

References Cited

UNITED STATES PATENTS

| | | | |
|---|---|---|---|
| 3,263,154 | 7/1966 | Steele | 321—69 |
| 3,334,293 | 8/1967 | Schultz | 321—69 |

OTHER REFERENCES

Varactor Applications, by Penfield and Rafuse, pub. 1962 by M.I.T. Press, pp. 297, 336–338 relied upon.

"Charge Storage Varactors Boost Harmonic Power," by G. Schaffner, pub. July 13, 1964, in Electronics, pp. 42–47 relied upon.

"Harmonic Generators, etc.," by R. Hall, pub. Jan. 18, 1965 in Electronic Design, pp. 28–33 relied upon.

JOHN F. COUCH, *Primary Examiner.*

G. GOLDBERG, *Assistant Examiner.*